(12) United States Patent
Hatzinikolas

(10) Patent No.: US 9,316,004 B1
(45) Date of Patent: Apr. 19, 2016

(54) SUPPORT BRACKET ASSEMBLY AND METHOD

(71) Applicant: Michael Hatzinikolas, Edmonton (CA)

(72) Inventor: Michael Hatzinikolas, Edmonton (CA)

( * ) Notice: Subject to any disclaimer, the term of this patent is extended or adjusted under 35 U.S.C. 154(b) by 0 days.

(21) Appl. No.: 14/556,824

(22) Filed: Dec. 1, 2014

(51) Int. Cl.
 E04B 1/38 (2006.01)
 E04F 13/22 (2006.01)
 E04B 1/41 (2006.01)

(52) U.S. Cl.
 CPC . E04F 13/22 (2013.01); E04B 1/40 (2013.01); E04B 2001/405 (2013.01)

(58) Field of Classification Search
 CPC ............................. E04B 1/4178; E04B 1/7612
 USPC .................................... 52/702, 698, 378, 508
 See application file for complete search history.

(56) References Cited

U.S. PATENT DOCUMENTS

| | | | | |
|---|---|---|---|---|
| 779,268 | A * | 1/1905 | Elliott ............................. | 52/428 |
| 1,697,003 | A * | 1/1929 | Fink ................................ | 404/47 |
| 2,363,156 | A * | 11/1944 | Sinner et al. ................... | 52/378 |
| 3,050,160 | A * | 8/1962 | Chesser ......................... | 403/274 |
| 3,234,702 | A | 2/1966 | Zibell | |
| 3,414,224 | A * | 12/1968 | Watford et al. ............... | 248/243 |
| 3,450,427 | A | 6/1969 | Fischer | |
| 3,680,271 | A * | 8/1972 | Satchell ....................... | 52/656.1 |
| 3,942,292 | A * | 3/1976 | Robinson ..................... | 52/204.2 |
| 4,013,253 | A * | 3/1977 | Perrault et al. ........... | 248/222.51 |
| 4,390,103 | A * | 6/1983 | Husband ....................... | 211/182 |
| 4,515,494 | A * | 5/1985 | Robilliard et al. ............ | 403/187 |
| 4,805,364 | A * | 2/1989 | Smolik ........................... | 52/241 |
| 4,827,684 | A * | 5/1989 | Allan ............................. | 52/378 |
| 4,869,043 | A | 9/1989 | Hatzinikolas et al. | |
| 5,035,099 | A * | 7/1991 | Lapish ............................ | 52/713 |
| 5,063,715 | A * | 11/1991 | Goodman ...................... | 52/36.6 |
| 5,082,388 | A * | 1/1992 | Lauterbach ................... | 403/254 |
| 5,265,396 | A * | 11/1993 | Amimoto .................. | 52/745.12 |
| 5,313,752 | A | 5/1994 | Hatzinikolas | |
| 5,392,581 | A | 2/1995 | Hatzinikolas et al. | |
| 5,619,834 | A | 4/1997 | Chen | |
| 5,816,008 | A * | 10/1998 | Hohmann ....................... | 52/565 |
| 6,128,883 | A | 10/2000 | Hatzinikolas | |
| 6,161,709 | A * | 12/2000 | Kluge et al. .................. | 211/117 |
| 6,298,620 | B1 | 10/2001 | Hatzinikolas | |
| 6,584,741 | B1 | 7/2003 | Hatzinikolas | |
| 6,973,756 | B2 | 12/2005 | Hatzinikolas | |
| 7,367,165 | B2 | 5/2008 | Hatzinikolas | |
| 7,392,911 | B2 * | 7/2008 | Stitchick et al. ........... | 211/90.02 |
| 7,415,803 | B2 | 8/2008 | Bronner | |
| 7,469,659 | B2 | 12/2008 | de Jonge et al. | |

(Continued)

*Primary Examiner* — Basil Katcheves
(74) *Attorney, Agent, or Firm* — Kenneth L. Bousfield; Bereskin & Parr LLP/S.E.N.C.R.L.,s.r.l.

(57) ABSTRACT

A support assembly is provided for supporting external veneer. It has a mounting bracket that is fixedly mounted to a load bearing wall support structure, and a shelf angle. The shelf angle includes a horizontal leg that defines a surface upon which to mount the external facing members. The mounting bracket may be a channel. The legs of the channel may each be formed to have a seat. The seat includes an outwardly protruding toe, an accommodation for the shelf angle, and an overhanging finger. The back of the shelf angle may have apertures to admit the toes of the mounting bracket, such that the vertical load is transferred from the web of the shelf bracket to the toes. The toes do not extend below the horizontal leg of the shelf angle, and do not protrude downwardly of it. The seat includes an oversized slot having a relief angle to permit the shelf angle web to be rotated angularly during assembly. The finger is also relieved, at an angle of relief greater than the slot.

20 Claims, 13 Drawing Sheets

(56) References Cited

U.S. PATENT DOCUMENTS

| | | |
|---|---|---|
| 7,654,058 B2 | 2/2010 | Hatzinikolas |
| 7,908,804 B2 | 3/2011 | Vieira |
| 8,051,621 B2 | 11/2011 | Hatzinikolas |
| 8,333,048 B2 | 12/2012 | Talpe |
| 8,490,340 B2 | 7/2013 | Hatzinikolas |
| 8,490,341 B2 | 7/2013 | Hatzinikolas |
| 8,516,763 B2 | 8/2013 | Hohmann, Jr. |
| 8,555,595 B2 | 10/2013 | Hatzinikolas |
| 8,621,802 B2 | 1/2014 | Spyrou |
| 8,667,763 B2 | 3/2014 | Hatzinikolas |
| 8,893,452 B2 | 11/2014 | Hatzinikolas |
| 8,955,263 B2 | 2/2015 | Hatzinikolas |
| 9,010,062 B2 | 4/2015 | Hill |
| 9,027,301 B2 | 5/2015 | Guinn |

* cited by examiner

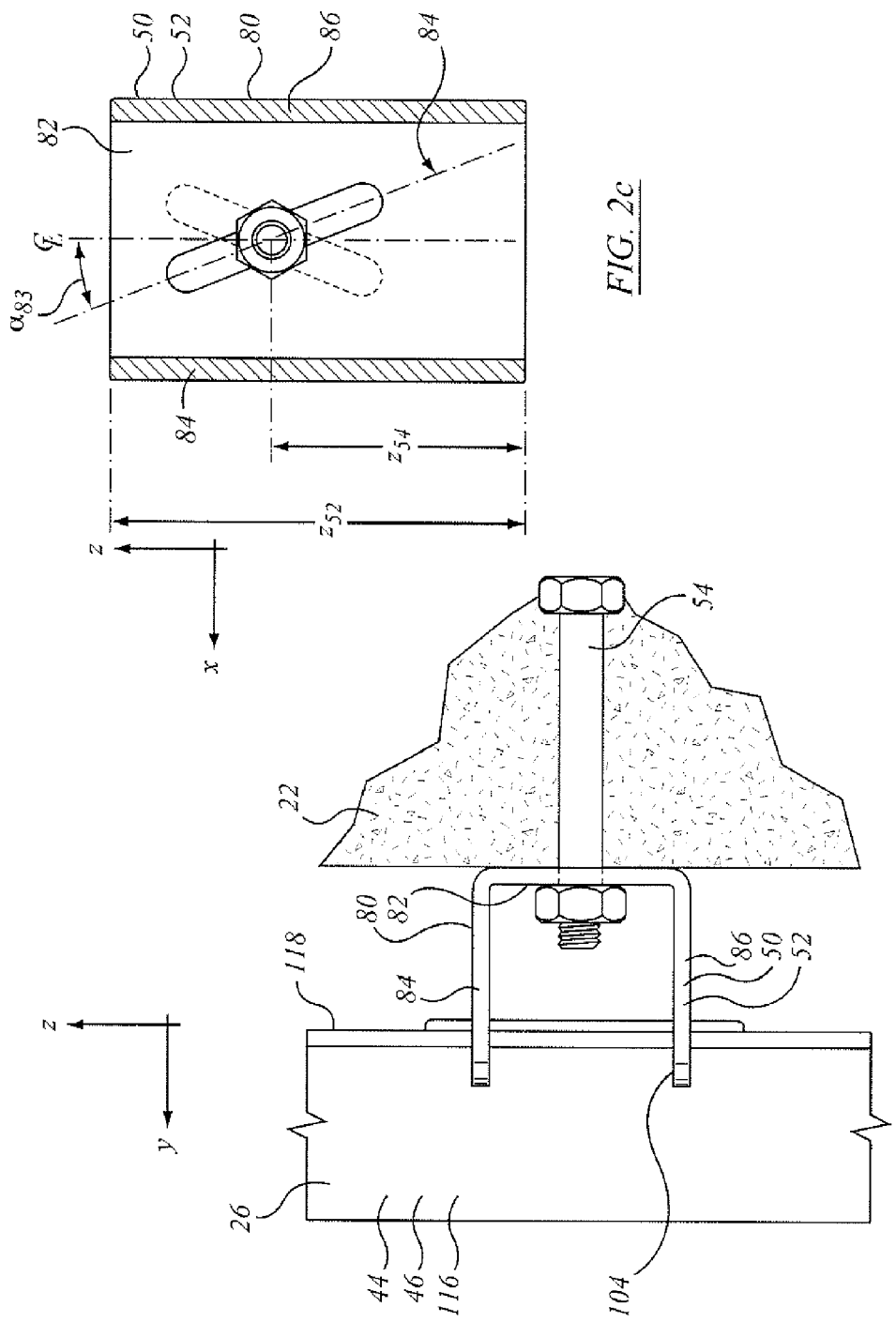

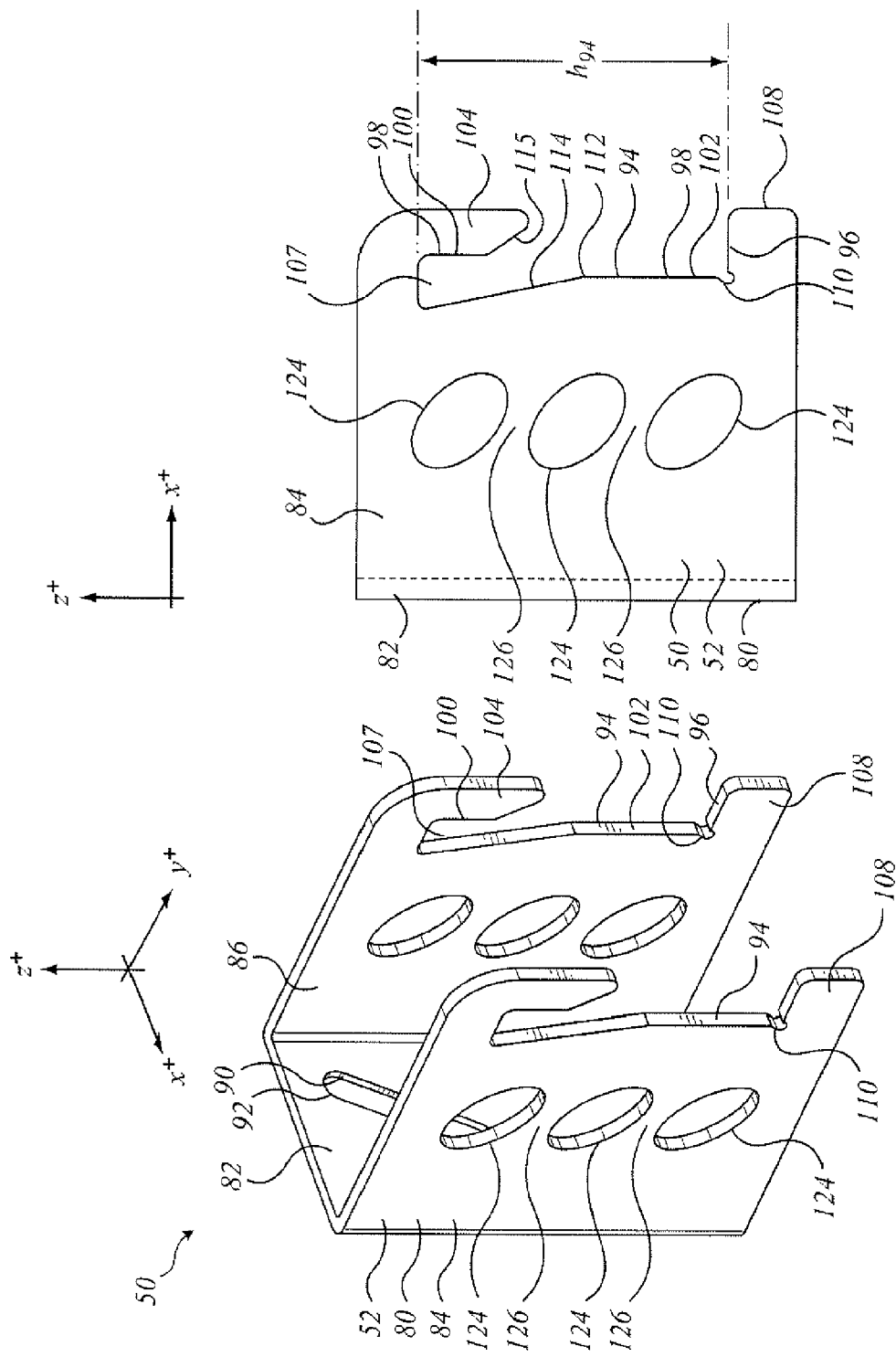

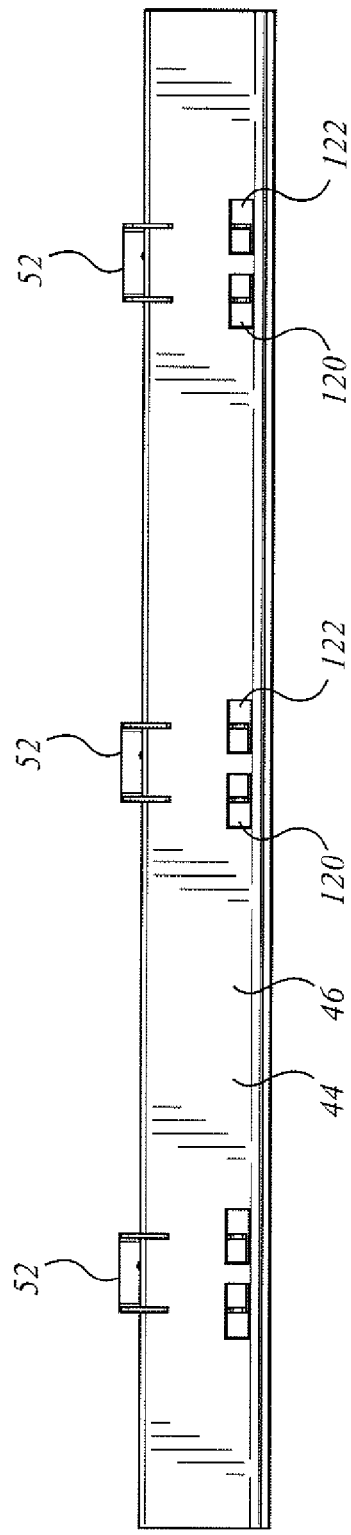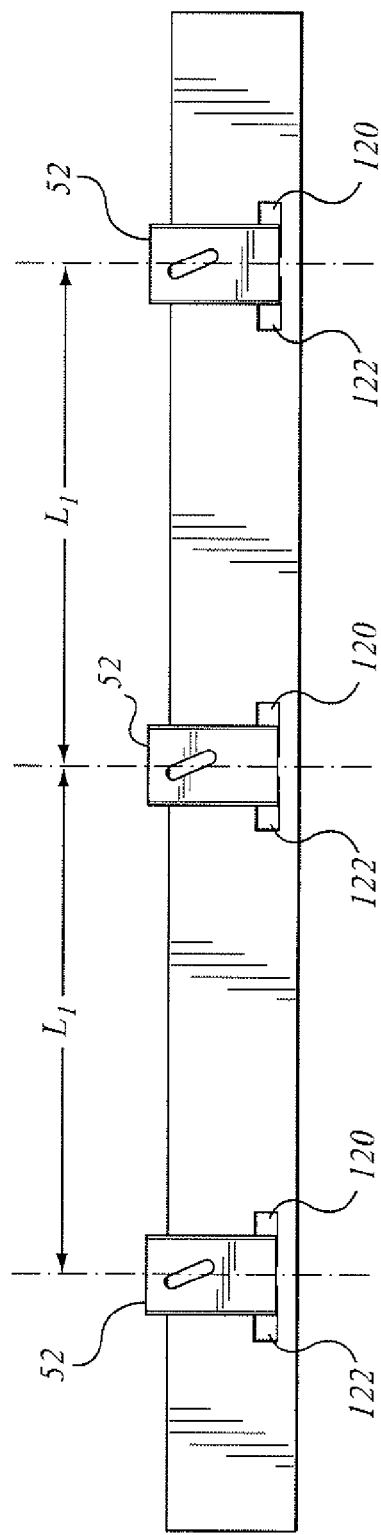
FIG. 3d
FIG. 3e

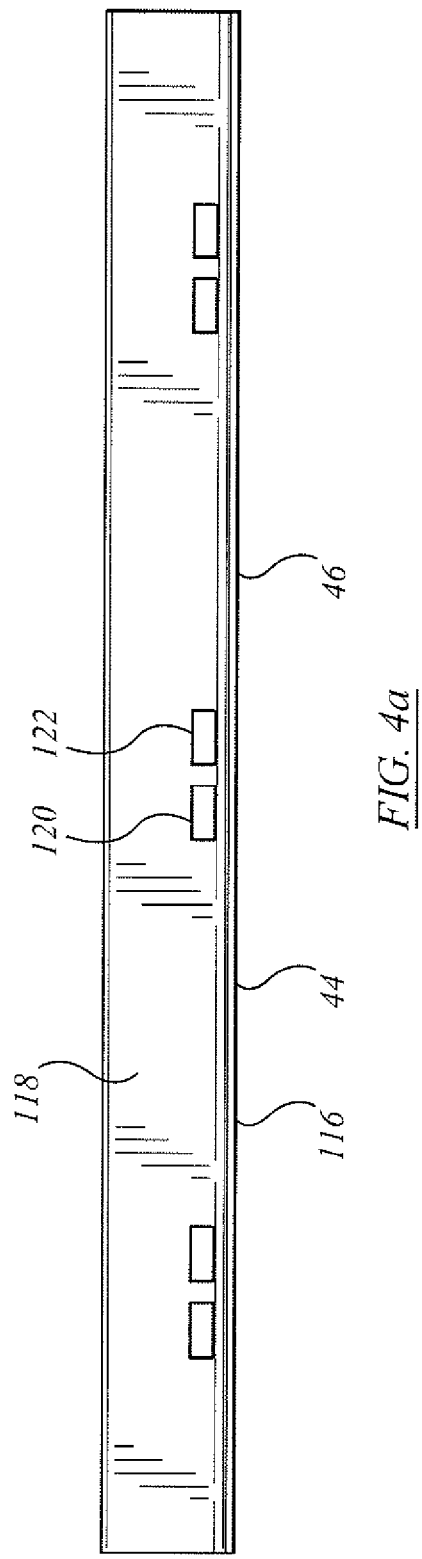
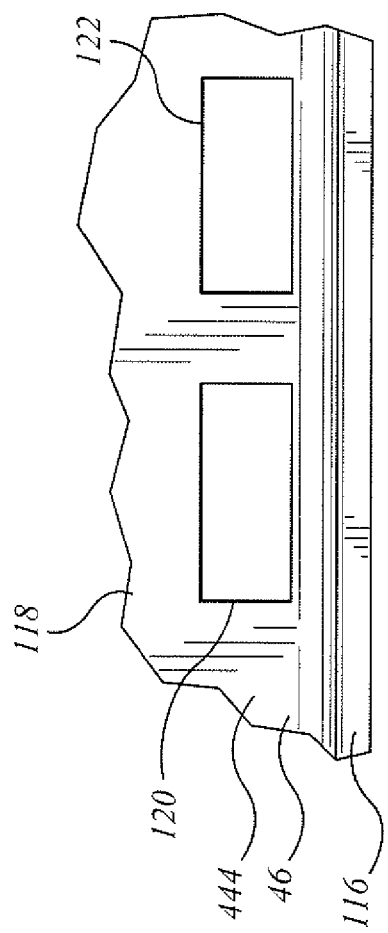

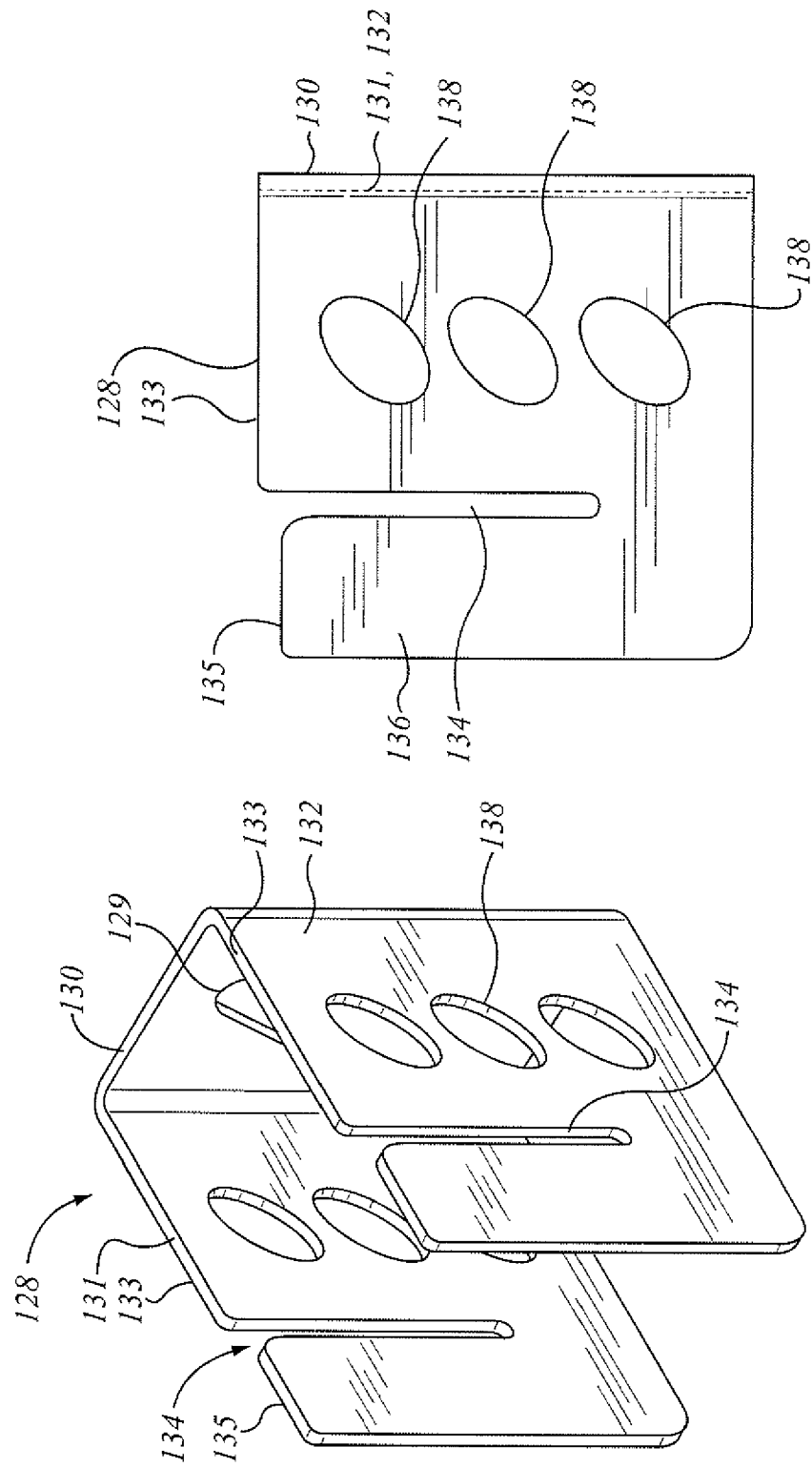

SUPPORT BRACKET ASSEMBLY AND METHOD

FIELD OF INVENTION

This specification relates to structural materials for use in the construction of buildings, and, in one particular context, to support structure external veneer components.

BACKGROUND OF THE INVENTION

In former times, brick walls were load bearing structures. In contemporary building structures bricks, or other masonry elements, or other visible finished surface elements, are rarely load-bearing and tend more often to be employed as surface cladding on the exterior face of load-bearing structure.

When mounting face brick or stone veneer on the face of a wall structure, it is common to support the first row of bricks or stone, or veneer on a steel support. The steel support may be termed a shelf angle, and may extend outward from the wall structure, and may run along, or have a major dimension extending in, a direction that is generally horizontal and cross-wise to the wall. The steel support is mounted to the on the wall before brick-laying commences. The steel support may be welded to a steel anchoring system embedded in the wall. Alternatively, the steel support may be carried in spaced apart brackets that have themselves been mounted to the load bearing wall structure.

SUMMARY OF INVENTION

In an aspect of the invention there is an external facing support assembly. It has a first member and a second member. The second member is engageable with the first member for support thereby. The first member has a mounting fitting by which to secure the assembly to load-bearing wall structure. The first member has a seat located distant from the mounting fitting. The seat has a protrusion, a shear load receiving interface, and a moment couple reaction interface. The second member has an external facing carrier and a seat engagement. The carrier is connected to the seat engagement. The seat engagement has an accommodation sized to admit the protrusion; a shear load transmission interface that, in use, engages the shear load receiving interface; and a moment couple transmission interface that, in use, engages the moment couple reaction interface.

In a feature of that aspect of the invention, the protrusion has an upwardly facing shoulder, and the upwardly facing shoulder defines the shear load receiving interface. In another feature, the carrier is located lower than the protrusion. In another feature, the carrier has an upwardly facing interface above which to locate the external facing, and, as installed in use, the shear load receiving interface is located higher than the upwardly facing interface of the carrier. In still another feature, the second member is a shelf angle having a flange and a web. The flange defines an upwardly facing external veneer load receiving interface. The web has the accommodation for the protrusion formed therein. In an additional feature, the web is an upstanding web; and the upstanding web has a greater vertical extent than the seat. In a still further additional feature, the web includes an aperture formed therein at a medial height location thereof, the aperture permitting introduction of the protruding toe therethrough, and the aperture defining the accommodation. In another feature, on assembly, the flange is located one of: (a) flush with a lowermost portion of the protruding toe; and (b) downwardly proud of the protruding toe. In a still further feature, the flange and the web meet at a vertex, the vertex having an internal radius, and the accommodation is formed as an aperture in the web upwardly clear of the radius. In another feature, the seat engagement extends rearwardly and upwardly of the carrier.

In another feature, the first member is a channel member having a back and two spaced apart legs extending away from the back. The back of the channel has the mounting fitting. Each of the legs of the channel has one of the seats. In another feature, the assembly includes a plurality of the first members, and the second member has a plurality of the accommodations corresponding to the plurality of the first members. In a further feature, the assembly includes a plurality of the first members, and the second member has a plurality of the accommodations corresponding to the plurality of the first members.

In another feature, the protrusion has an upwardly facing shoulder defining the shear load transmission interface. The seat includes an upwardly extending slot and an over-hanging finger. The second member seat engagement includes a web having an upwardly extending extremity that, on assembly, seats in the slot. The over-hanging finger defines one portion of the moment-couple reaction interface. In a further feature, the slot is oversized to admit at least partial angular rotation of the web of the second member on installation. The slot has a relieved first wall portion angled on a first angle relative to vertical. The overhanging finger has a downwardly distal tip, the downwardly distal tip is relieved to accommodate insertion of the web on assembly; the downwardly distal tip having a chamfer on a second angle relative to vertical. The second angle is greater than the first angle.

In another aspect of the invention there is an external facing support assembly. It includes at least a first member and a second member. The first member has a first portion having a fitting by which to secure the first member to a wall. The first member has a second portion standing outwardly away from the first portion. The second portion includes a seat located distantly from the first portion. The seat has a protruding toe, a rebate located upwardly of the protruding toe, and an overhanging retainer. The second member is a veneer support. The veneer support has a foot upon which to mount at least one veneer member. The veneer support has a back to which the foot is joined. The back has a first accommodation in which to admit the protruding toe.

In a feature of that aspect, the foot of the second member defines a shelf for the at least one veneer member. The first member has first and second protruding toes. The bench has the first accommodation and a second accommodation. The first and second accommodations admit the first and second protruding toes, respectively. In another feature, the first member is a channel member having a back and a pair of first and second legs extending away from the back. The first portion of the first member includes the back of the channel member. The first leg of the channel member defines one the second portion of the first member. The second leg of the channel defines another the second portion of the first member. Each of the first and second legs has one the protruding toe. The back of the second member has the first accommodation and a second accommodation. The first and second accommodations are spaced apart to receive the respective protruding toes of the first and second legs of the channel member. In another feature, the second member is a shelf angle, the first portion of the second member is an horizontal leg of the shelf angle, and the second portion is a back of the shelf angle.

In a further aspect of the invention, there is a wall support assembly. It has a bench member, a first mounting member and a second mounting member. The first mounting member is a U-shaped bracket having a back and first and second legs extending from the back. The back has a mounting fitting by which to secure the back to supporting structure. The bench has a first portion, the first portion being an horizontally extending flange, the flange defining a seat for wall members. The bench has a second portion, the second portion defining a web running along the flange. The first and second legs of the bracket each have a seat into which to introduce at least a first portion of the web. The first and second legs of the bracket each have a protruding toe adjacent to its respective seat. The web has at least one lodgement into which to engage the respective protruding toes when the first portion of the web is located in the seat.

BRIEF DESCRIPTION OF THE ILLUSTRATIONS

The foregoing aspects and features of the invention may be explained and understood with the aid of the accompanying illustrations, in which:

FIG. 1b is an enlarged detail of an arrangement similar to the general arrangement of FIG. 1a;

FIG. 1c is a top view of the elements of the enlarged detail of FIG. 1b;

FIG. 2a is an isometric view of a structural element of the assembly of FIG. 1a;

FIG. 2b is a side view of the structural element of FIG. 2a;

FIG. 2c is a front view of structural element of FIG. 2a;

FIG. 3b is an isometric view of the structural elements of FIG. 3a viewed from behind, to the other side, and above;

FIG. 3c is an end view of elements of FIG. 3a;

FIG. 3d is a front view of the assembly of FIG. 3a;

FIG. 3e is a rear view of the assembly of FIG. 3a;

FIG. 4a is a front view of a structural element of the assembly of FIG. 1a;

FIG. 4b is an enlarged detail of the structural element of FIG. 4a.

FIG. 5a is an isometric view of an alternate embodiment of support bracket to that of FIG. 2a;

FIG. 5b is a side view of the support bracket of FIG. 5a;

FIG. 6a is a side view of an alternate assembly to that of FIG. 1a;

FIG. 6b is a side view of an alternate assembly to that of FIG. 6a;

FIG. 6c is a side view of another alternate assembly to that of FIG. 6a; and

FIG. 6d is a side view of a further alternate assembly to that of FIG. 6a.

DETAILED DESCRIPTION

Figure 1A:
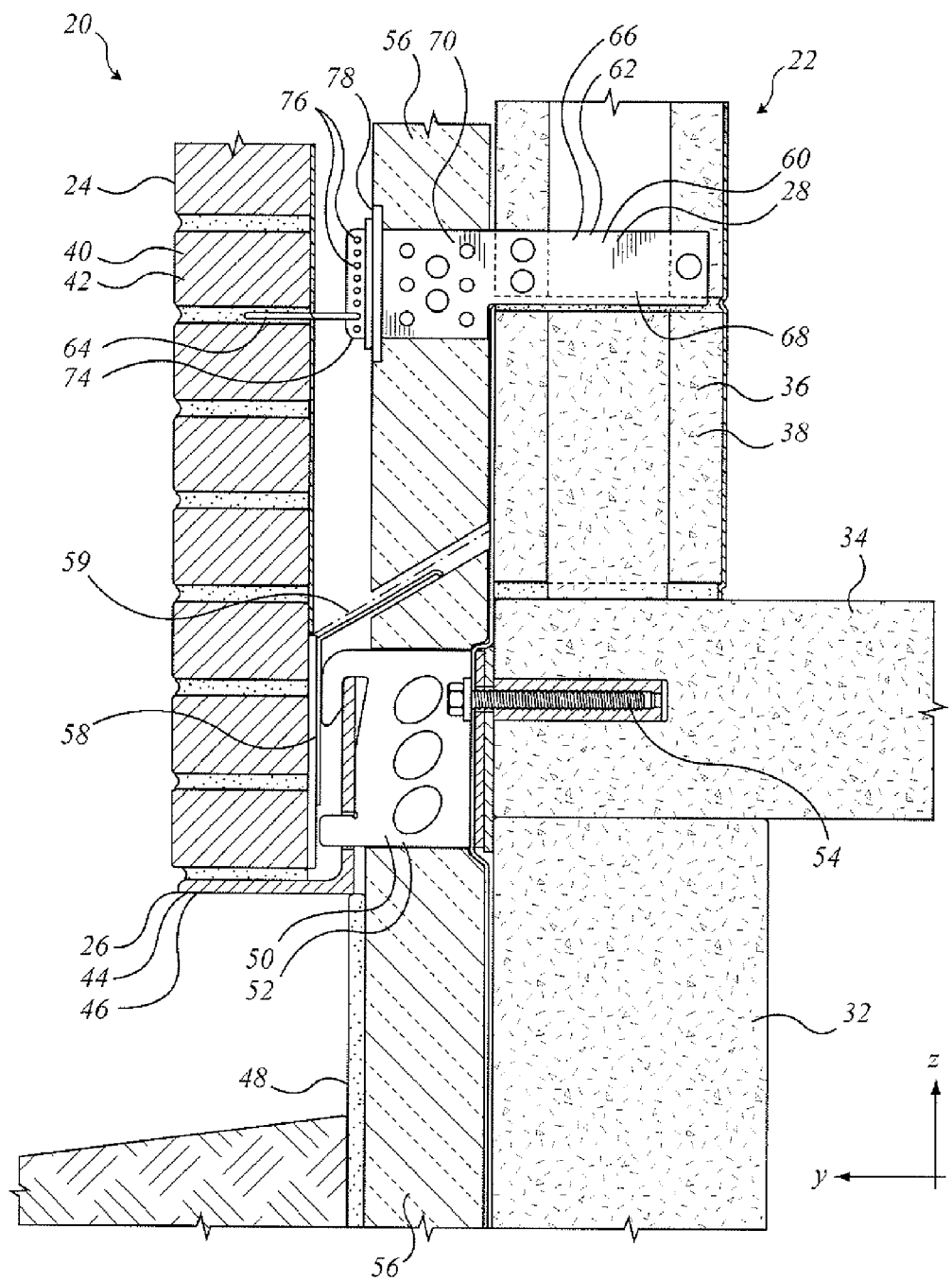
FIG. 1a is a side view in section of a general arrangement of an assembly of wall elements according to an aspect of the invention.

The description that follows, and the embodiments described therein, are provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The drawings may be taken as being to scale, or generally proportionate, unless indicated otherwise.

The terminology used in this specification is thought to be consistent with the customary and ordinary meanings of those terms as they would be understood by a person of ordinary skill in the art in North America. Following from the decision of the Court of Appeal for the Federal Circuit in *Phillips v. AWH Corp.*, the Applicant expressly excludes all interpretations that are inconsistent with this specification, and, in particular, expressly excludes any interpretation of the claims or the language used in this specification such as may be made in the USPTO, or in any other Patent Office, other than those interpretations for which express support can be demonstrated in this specification or in objective evidence of record in accordance with *In re Lee*, (for example, earlier publications by persons not employed by the USPTO or any other Patent Office), demonstrating how the terms are used and understood by persons of ordinary skill in the art, or by way of expert evidence of a person or persons of experience in the art.

Referring to the general arrangement of FIG. 1a, there is a partial cross-section of a wall assembly, indicated generally as 20. For the purposes of this description it may be helpful to consider a Cartesian co-ordinate frame of reference. The vertical, or up-and-down, direction may be designated as the z-axis, or z-direction. The direction perpendicular to the plane of the page may be considered as the longitudinal direction or x-direction, or x-axis, and may be taken as being the cross-wise direction of the wall. The left-to-right direction in the plane of the page, i.e., perpendicular to the wall, may be considered the sideways, or y-direction, or y-axis.

In this description, reference is made to load-bearing structure, and load-bearing wall structure. The description pertains to mounting bracket assemblies that support external facing veneer components, such as face brick, spaced away from the supporting structure. The mounting brackets are anchored to load-bearing structure. Whether that load bearing structure is a structural wall or a concrete floor slab carried by framework, by a poured wall, by a block wall, or other load bearing members, in the context of this description whether it is a wall, a floor, or a ceiling, within the meaning of this specification it is a load-bearing wall structure to which the veneer supporting members may be mounted.

Wall assembly 20 may include load-bearing structure, indicated generally as 22, and externally visible facing elements, indicated generally as 24. The externally visible facing elements are mated to, or linked to, or stabilised by, load bearing structure 22. The linking, or positioning of the facing elements with the load-bearing structural elements may be achieved by the use of interface elements such as supports, or support assemblies, 26, and tying members 28. Support assemblies 26 and tying members 28 may be taken as being made of mild steel unless otherwise noted. Combinations of load bearing frame or wall assemblies, such as 22, facing elements 24, support assemblies 26 and tying assemblies 28 may be assembled as indicated in FIG. 1a.

Load-bearing structure 22 may have several different forms. First, it may include a foundation, which may be a poured concrete foundation 32. There may be a floor structure, such as a poured concrete floor slab 34. Floor slab 34 may carry a wall structure 36 which may have the form of laid blocks 38, or which may in other embodiments include a framed structure, such as may be a wood or steel framed structure.

Visible facing elements 24 may include brickwork 40, or stonework, be it rough stone or finished stone, or other cladding. The anchor system described may be used for supporting masonry veneer, thin granite veneer, large stone panels or pre-cast concrete in place of the bricks. In the example shown, facing elements 24 are shown as bricks 42 laid in successive courses. As suggested by FIG. 1a, support assembly 26 may include a base or bench or first member 44 that may have the form of a "shelf angle", or angle iron 46. Angle iron 46 runs along the wall structure in the horizontal direction and provides the bed upon which the lowest course of bricks finds its support, hence angle iron 46 may be termed a brick support. Angle iron 46 may rest with the back or the angle iron seated above a non-load bearing abutment or stop or skirt such as plate 48. First member 44 may be mounted to a second member 50, which may have the form of a support bracket 52. Second member 50 it itself fixedly mounted to the load bearing wall structure. The vertical load of the facing, e.g., bricks 42 is carried by the bench or "shelf" of first member 44, and passed into such number of second members 50 as may support first member 44.

Figure 3A:
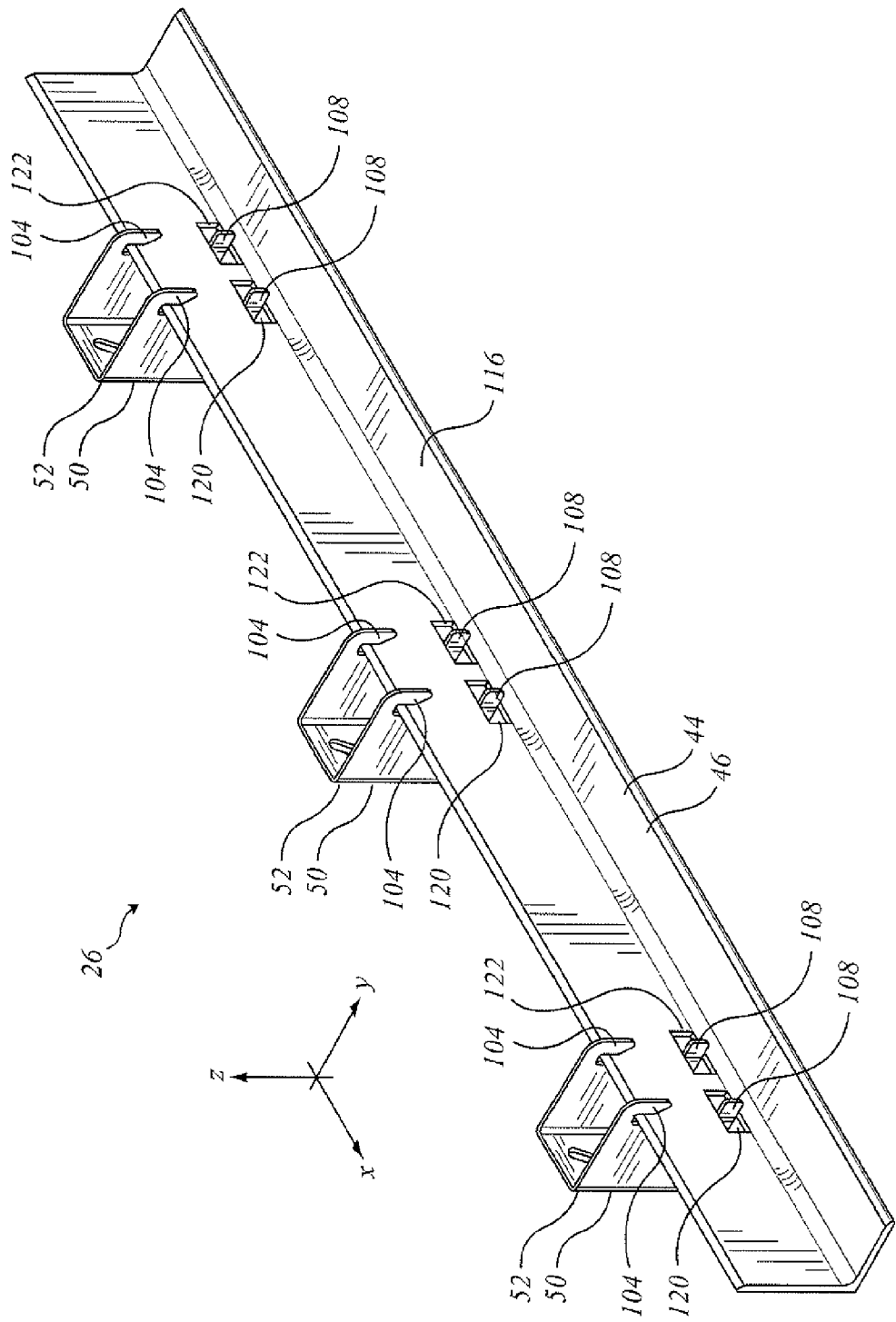
FIG. 3a is an isometric view of structural elements of the assembly of FIG. 1a shown without associated wall members from in front, to one side, and above.
Figures 3B, 3C:
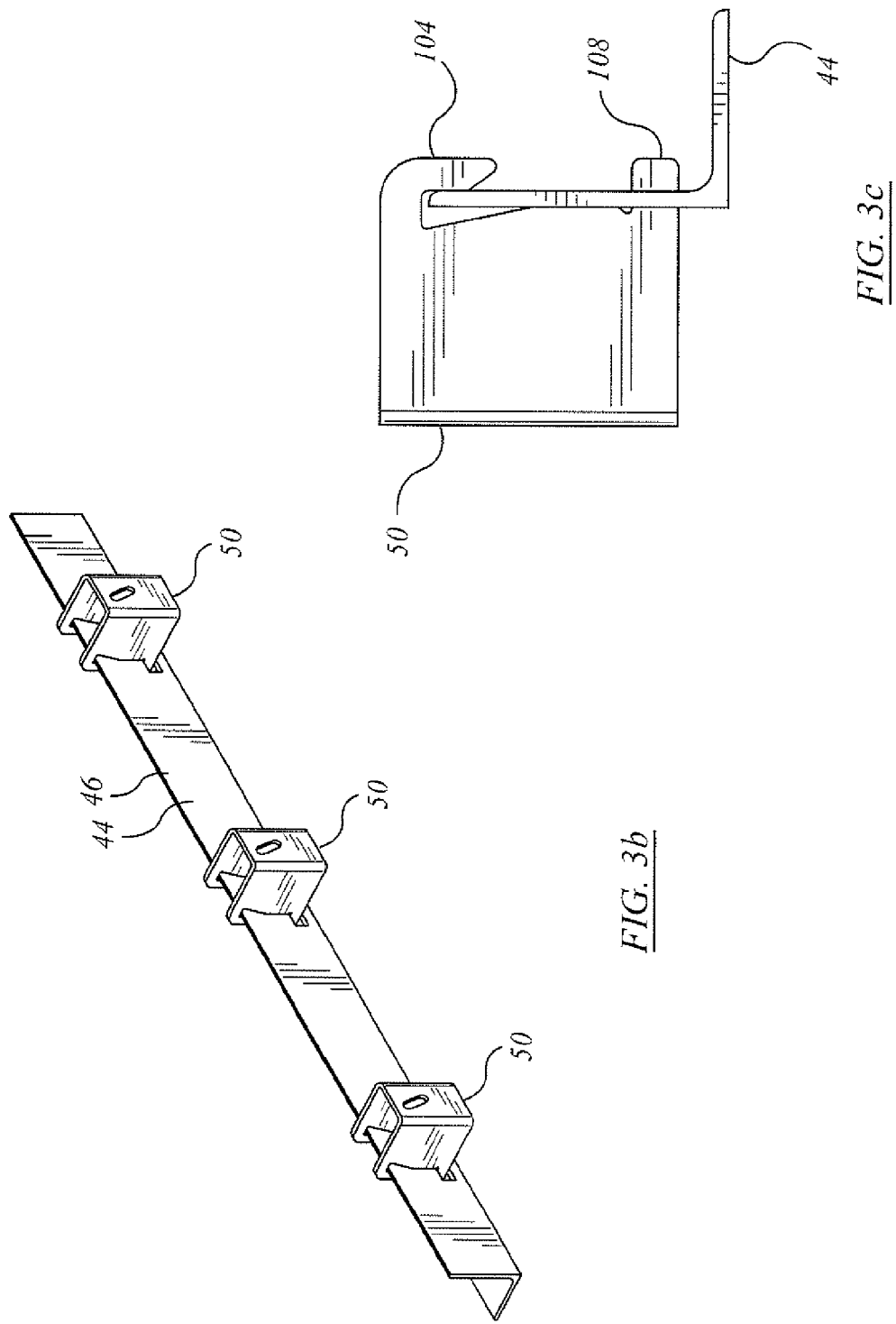

There may typically be at least first and second such second support members 50 spaced laterally apart. For example, there may be several such supports on, for example, 24" centers, indicated as spacing $L_1$, which may correspond to the spacing, or double the spacing of wall studs in standard framing (see FIG. 3e). Second members 50 may then carry the shear load from first member 44 into the load bearing wall structure. The depth of second members 50 in the y-direction (i.e., normal to the wall) may typically be less than the vertical height of second members 50, such that the webs of second members 50 may be considered low aspect ratio beams in which the bending moment is small, or negligible.

Second members 50 are secured to load bearing wall 22. The securement may be by suitable means. For example mechanical securements in the nature of threaded fasteners 54. In the case of securement to a poured concrete wall or floor slab (as shown) the fasteners may be concrete anchors. Fasteners 54 may be concrete anchor fittings, as shown in FIG. 1a, or embedded threaded rods, studs, or bolts, as in FIG. 1b.

Second members 50 have a depth (in the y-direction) that may correspond to, or may be greater than, the thickness of insulation panels 56 such as may be mounted to the front (or outside) face of the structural load-bearing wall assembly 22. There may also be a drainage shield, or flashing, 58 such as may encourage moisture to drain outwardly of and away from structural wall assembly 26. A vapour barrier membrane 59 may be captured behind insulation panels 56 upwardly of the floor slab, may traverse insulation 56 at the level of flashing 58, and may lay overtop of flashing 58 with its lowermost margin draining over angle iron 46, such that any moisture draining over vapour barrier 59 is drained away. That is, a continuous metal flashing 58 is supported on or above shelf angle 46. It may connect to a continuous flexible flashing which extends over the brick supports and that may connect to a vapour barrier membrane on the outer face of the wall. Sheets of rigid insulation are mounted over top of the membrane on the outer face of the wall. The anchor system allows cavity insulation to be continuous behind the brick support. The rigid insulation may be of a thickness that allows an air space between the insulation and the external veneer brick facing mounted on shelf angle 46. The anchor brackets 52 may be made in a variety of sizes each corresponding to a desired thickness of the rigid insulation and air space. In this arrangement, a standard size of brick support shelf angle 46 may be used without regard to the spacing between the brick facing and the face of the wall desired for insulation.

In some embodiments, tying members 28 may be located upwardly of support assembly 26. Tying members 28 may have the form of brick tie assembly 60, in which there is an anchor 62 and a brick tie 64. As may be noted, anchor 62 has a body 66 such as may have the form of a stamped steel plate. The distal portion of body 66 may be termed a tail 68. Tail 68 may have a length in the y-direction (i.e., into the wall) corresponding to the through thickness of cinder blocks 38, and such as may be located between adjacent blocks of a block wall, and embedded in the mortar therebetween. To that end, tail 68 may have perforations such as may permit mortar to flow therethrough. Body 66 may also have a proximal portion 70 of a depth in the y-direction corresponding to the thickness of insulation panel 56. Proximal portion 70 may be perforated to reduce thermal conduction in the y-direction. Proximal portion 70 may have a step, or abutment, or indexing or locating feature, such as a shoulder, by which the correct depth position in the y-direction is obtained relative to the cinder block and the insulation. Body 66 may also have an outermost end portion 74 having an array of tie location apertures, or seats or positions 76. A faceplate 78 seats on the outside face of the insulation, and may be used on installation where the positioning of anchor 62 is set prior to installation of tail 68 in a poured concrete form. Brick tie 64 is then located in one or another of the seat positions 76. When the successive courses of bricks 42 are laid, the outermost ends of brick tie 64 are embedded in the mortar between courses, as suggested in FIG. 1a. Tying members as described are used where the air or insulation space between the load bearing structure and the external veneer exceeds one inch, and in all cases where the wall height exceeds 30 ft. Tying members such as those described may be placed on up to 24 inch spacing vertically, and up to 32 inch spacing horizontally.

Figure 1B:
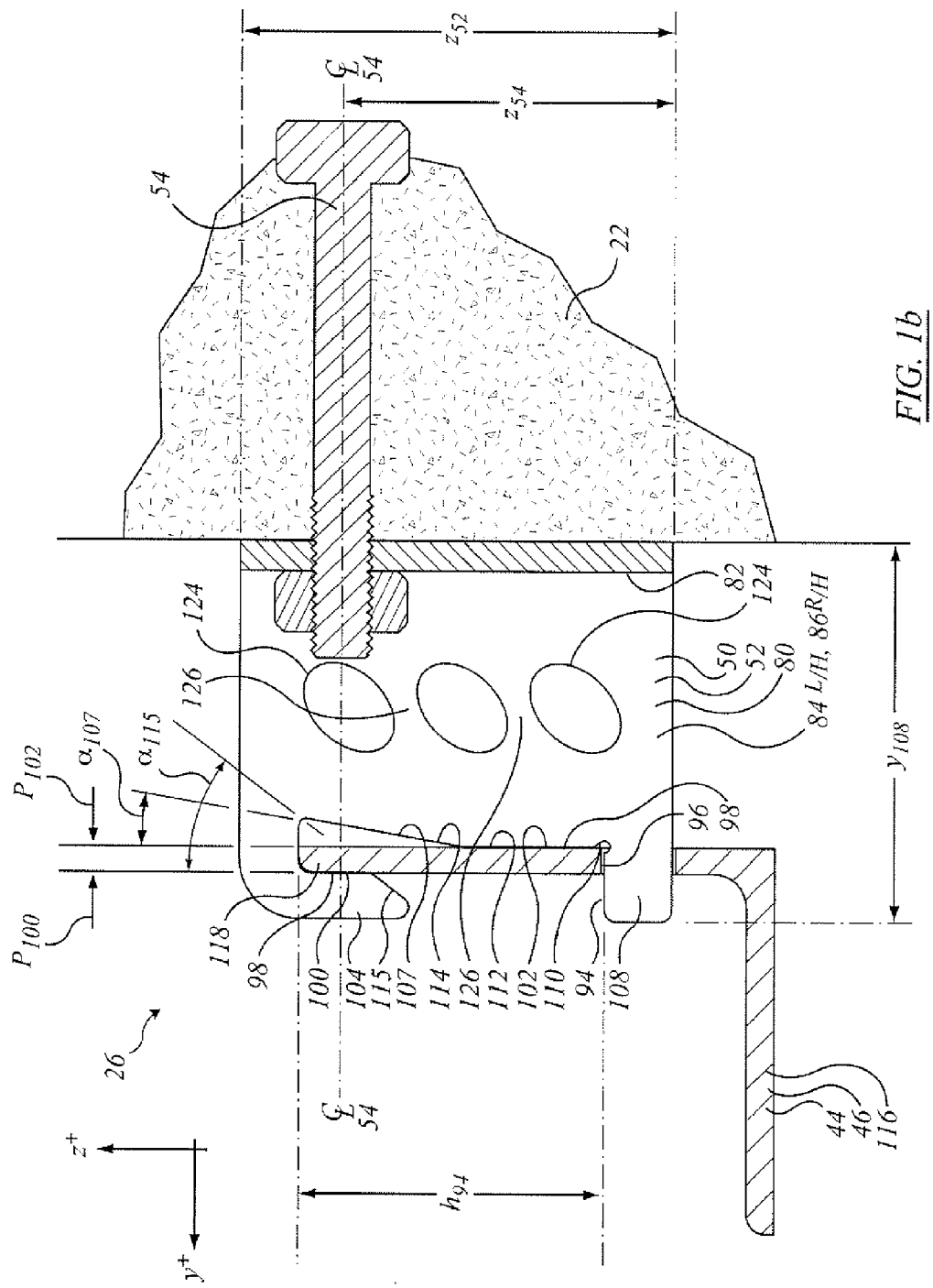

Considering the enlarged detail of the embodiment of FIG. 1b, support bracket 52 may have the form of a channel 80 (as viewed from above, as in FIG. 1c) having a first member in the nature of a rear plate or back 82, and a second member in the nature of a web or leg 84. Channel 80 may also have a third member in the nature of a second web or leg 86. In the embodiment shown, legs 84 and 86 stand outwardly of back 82. That is, as installed back 82 may lie in an x-z plane abutting the load bearing structure, be it framing, metal girders, poured concrete wall or poured concrete slab, and so on. Legs 84 and 86 stand outwardly away from that x-y plane. In general, it may be convenient that legs 84 and 86 stand in y-z planes perpendicular to the plane of back 82, standing spaced apart and parallel, but this is not necessarily so. For example, legs 84, 86 could be splayed to form a V or winged shape as opposed to a square-sided U. In the particular embodiment illustrated, legs 84, 86 are a pair of side plates that extend from respective sides of the rear plate, back 82, in a direction away from the wall to form the sides of the U-shaped channel. The side plates are generally rectangular in shape and lie in respective vertical planes.

Back 82 may have a mounting, a seat, or an attachment fitting 90 such as shown in FIG. 2c by which mechanical fastener 54 may secure bracket 52 to the load bearing structure. In general, in all of the embodiments herein a shim plate, such as may be substantially similar in size to the anchor bracket, may be mounted between each anchoring bracket and the outer face of the wall (i.e., load-bearing wall assembly 52), as may be suitable, for evenly engaging the concrete surface and for spacing each anchor bracket 52 from the wall as desired to accommodate irregularities in the outer face of the wall. Fitting 90 may be a slot 92 that permits height adjustment of bracket 52. Slot 92 may be oriented at a non-parallel angle or direction that is skewed relative to the vertical axis. Slot 92 may be an elongate aperture in back 82 that extends along an inclined axis 83 angularly offset from vertical. FIG. 2c shows a left-hand configuration. The inclined axis may be offset 22.5 degrees from vertical. In a right hand configuration the fastener slot may be offset 22.5 degrees from vertical axis in the opposite direction. The upright plate of back 82 can thus be fastened to the wall at numerous locations relative to the wall corresponding to different positions of the bolt within the slot. As installed, fastener 54 may be in tension, and the lowermost edge of back 82 may be in compression, i.e., pressed against the load-bearing structure, such that there is a moment reaction and a moment arm, $z_{54}$. Slot 92 may be located closer to the upper margin of bracket 52 than to the lower margin, such that moment arm $z_{54}$ of the reaction of bracket 52, defined as the distance from the centerline of fastener 54 to the lower margin, is typically greater than half the height of bracket 52, indicated a $z_{52}$, (FIGS. 1b and 2c). In the default, the upper datum of $z_{54}$ may be taken as the mid-height location of fitting 90, namely half way up in the middle of slot 92. Slots 92 of successive brackets 52 may be alternately left handed and right handed. That is, in use, a plurality of anchor brackets may be spaced horizontally across a wall using a chalk line and a measuring tape. The anchoring brackets are mounted in an alternating arrangement of left-hand and right-hand configurations. The brackets are mounted along the wall such that each anchoring bracket having a left-hand orientation is beside an anchor bracket having a right-hand orientation. On installation, the vertical shear load may tend to cause the brackets to wedge and lock in position on the fasteners.

The side plates defined by legs 84, 86 are arranged to receive and to carry the brick support defined by bracket 46. Looking at leg 84 as being representative also of leg 86, and considering the profile shown in FIGS. 1b and 2b, the distal portion of leg 84 (i.e., the portion standing away most distantly from back 82) has a fitting, or accommodation, or seat 94 that is matingly co-operable with first member 44, and that provides a shear load transfer interface in which a vertical gravity load from member 44 is transferred into web 84 (or 86 as may be). The profile of each seat 94 in the respective side plates of legs 84, 86 may have the appearance of a recessed channel in the forward or foremost, or distal edge or margin thereof.

Seat 94 includes a vertical reaction interface, indicated at 96, and a moment restraint, indicated at 98. Moment restraint 98 includes an upper reaction member 100 and a lower reaction member 102. Leg 84 (or 86) may have an overhanging member, or finger 104 that, in use, over-reaches, and depends in front of, the uppermost margin of first member 44. The space between finger 104 and the upper leading edge of the body of leg 84 (or 86) more generally defines a receiving slot 107 as, or at, the upper portion of seat 94. Slot 107 extends upward, and has a rearward edge (i.e., at edge or wall 114) at a top end of the recessed, generally channel-shaped profile of seat 94. The inside face of the downward or distal tip of finger 104 may have the form of an abutment, or stop, or restraint that faces wholly, substantially, or predominantly in the −y direction, defining upper reaction member 100.

Vertical reaction interface 96 may be defined as the upper face of the toe, edge, or side of an extending portion or member or dog or toe 108, such as may be or define a protruding extension or protrusion in the y-direction of the lower margin of leg 84. That is, in the embodiment illustrated the recessed channel shape of seat 94 includes a shoulder at a bottom end. That shoulder defines vertical reaction interface 96, and it carries the shelf angle, such that the brick supporting flange extends laterally outward from the wall.

Lower reaction member 102 extends upwardly and away from the root of toe 108, and has the form of a wall or edge that faces wholly, substantially or predominantly in the +y direction. A fatigue detail, or stress relief detail, in the form of a finite radius relief 110 is provided at the root of the intersection of vertical reaction interface 96 and lower reaction member 102. The upper and lower stops (i.e., 100 and 102) constrain the translational degree of freedom of corresponding upper and lower regions of angle iron 46, and thus define a moment-couple reaction inhibiting motion in the rotational degree of freedom about the x-axis of angle iron 46 in the counter-clockwise direction.

Upwardly of an inflection point 112, wall 114 of seat 94, (being the back or rearward margin of slot 107) is relieved in the −y direction such that seat 94 may include, and slot 107 may be, a slanted slot or accommodation such as to permit entry of the upper leg of angle iron 46 into the accommodation on installation. The angle of inclination $\alpha_{107}$ may be in the range of 10-20 degrees in some embodiments. The lowermost extremity of the inside tip of finger 104 may also be trimmed, or tapered, or chamfered as at 115. The angle or size of the chamfer or relief at 115, designated as $\alpha_{115}$, is steeper, i.e., smaller, than the size of angle $\alpha_{107}$ of the chamfer or relief of wall 114. That is, whereas wall 114 may be angled at 10-20 degrees, from vertical, the relief at 115 may be more than 20 degrees, and may be about 24 or 25 degrees. Lower reaction member 102 may extend in a vertical plane, $P_{102}$. Upper reaction member 100 may extend in a vertical plane $P_{100}$. Planes $P_{102}$ and $P_{100}$ may be parallel and spaced apart, with upper reaction member 100 being more distant from back 82 than is lower reaction member 102. They may be spaced apart by a distance corresponding to the through thickness of the upstanding leg of angle iron 46.

The overall height of seat 94 may be taken from the vertical shear transfer receiving interface of shoulder 96 to the uppermost extremity of slot 107, and is indicated as $h_{94}$ in FIG. 1b. In this embodiment, shelf angle 46 is mounted at a height that corresponds generally to the height of the attachment interface of back 82 to the load-bearing support wall structure. This may be expressed several ways. First, it may be expressed in the relative squareness of the mounting bracket when seen in side view, as in FIGS. 1b and 2b. In this embodiment the most distant extremity of toe 108 is the same distance from back 82 as is the most distant extremity of finger 104. That distance, $y_{108}$, may be comparable to the overall height of member 50, indicated as $z_{52}$. It may be that the ratio $z_{52}/y_{108}$ may lie in the range: $2/3 < z_{52}/y_{108} < 3/2$. As another measure of squareness, the lateral projection of fastener 54 falls between the upper and lower boundaries of seat 94. Expressed differently again, the projection of the y-direction of mounting fitting 90, namely slot 92, falls within the projection of seat 94 in the y-direction. This may be expressed equivalently as the projection of seat 94 in the y-direction including the footprint of the mounting fitting. Either of those conditions also implies that the y-direction projection of shelf angle 46 also falls upon the mounting fitting footprint. As another expression of the squareness, it may be said that seat 94 lies opposite to mounting fitting 92, or generally substantially or predominantly in line with mounting fitting 92, as opposed to being offset downwardly therefrom as in the apparatus shown of FIGS. 6a-6d, discussed below.

The brick support defined by angle iron 46 may include a mounting flange which engages anchor bracket 50, and a supporting flange arranged to carry bricks. The mounting flange and the supporting flange may typically be mounted at right angles to form an L-shaped angle iron, typically made of steel. As in FIG. 3a, angle iron 46 has a first or horizontal leg 116 and a second or vertical leg 118. Horizontal leg 116 extends forwardly (in the +y direction) away from vertical leg 118, and hence on installation also forwardly and away from bracket 52. Horizontal leg 116 runs along the wall structure in the x-direction. Typically the running length of the angle iron is much greater than the horizontal leg length. For example, in one embodiment the running length may be 72 inches, while the leg of the angle may be 6 inches or less. In various embodiments the x:y aspect ratio of lengths may be in the range of 4:1 to 16:1. Bracket 52 may be cut to length as may suit. As installed, the length of leg 118 proud of the end of toe 108 in the y-direction may have a length corresponding to the depth in the y-direction of the facing members to be supported. In the case of face brick, that length corresponds to the depth of the face brick. In some embodiments it may be somewhat less than the depth of the face brick to permit the iron to be less noticeably visible, as in FIG. 1*a*, or to be hidden, as in the embodiment of FIGS. 6*a*-6*d*.

In the embodiment of FIG. 1*a*, vertical leg 118 has an accommodation, slot, aperture, socket, or relief, or reliefs 120, 122 spaced upwardly from the junction of members 116 and 118. The lower margin of reliefs 120, 122 may be located at or above the run-off of the rolled radius between members 116 and 118, i.e., in the tangent portion of the vertical leg, rather than in the radius. Reliefs 120, 122 are sized to receive the dogs, or toes 108 of web members 84 or 86. They are over-sized in the x-direction to permit lateral adjustment of bracket 52, as, for example, according to the fastener position along inclined slots 92. For half inch thick legs, the slot may be 2.5 inches wide, giving, potentially, one inch play to either side of center. The height of the slot may be slightly oversize to permit rotating installation of bracket 52. The vertical through thickness of each toe 108 may be 1" or more.

In the engagement of toe or dog 108 in accommodation or relief 120 or 122, as may be, it may be that the lowermost margin of leg 84 (or 86) does not extend lower than (i.e., downwardly proud of) the bottom of horizontal leg 116, such that no additional vertical clearance allowance is required for toe 108, meaning that the toe is concealed behind the external veneer and the bottom edge of the lowest course of bricks may be lower than otherwise. Expressed differently, in terms of a seating arrangement of structural members, second member 50 may be considered to be the receiving member, and first member 44 may be considered to be the received member. In the arrangement of FIGS. 1*a*, 1*b*, and 3*a* to 3*e*, the received member is flush with, or extends downwardly proud of, the lowermost portion or extremity of the receiving member and may tend to conceal the receiving member from view. The engagement of the receiving and received members is a mechanical interlocking relationship that is biased into securement by gravity acting on the load. That is, while the angle iron may be adjustable and engageable while unloaded, the loading of bricks or other surface elements may tend to increase the moment couple on the angle iron, such as may tend to tighten the hold of the moment couple reaction members of the receiving member.

The receiving slot 107 slidably receives an edge portion of the mounting flange of leg 118 therein such that the brick support remains secured to the anchoring bracket 46 when a weight of bricks is stacked on the supporting flange of leg 116. The rearward edge 114 of receiving slot 107 extends upward at a slight rearward incline for accommodating the edge portion of the mounting flange of leg 118 as it is inserted therein. A wedge shaped shim may then be inserted between the distal tip of leg 118 and the rearward edge 114 such as to lock the assembly in tight engagement.

The received member, such as the shelf angle identified as angle iron 46, is itself a receiving member, or accommodation, for the externally visible facing elements, and as the facing elements are received, rearward structure such as bracket 52 is obscured from view. The received member need not be an angle iron, and whether or not it is an angle iron, is need not have a 90 degree angle. In more general terms, the received member has a first portion that defines a seat or bench, or accommodation, or support, or platform or undergirding, or shelf, for the externally visible facing members, hence the term "shelf angle". It is a form of sill. The received member also has a second portion that engages the receiving member such that vertical load from the received member is transmitted or carried into the receiving member and thence into the load-bearing supporting structure. In that sense the second portion can be thought of as an engagement fitting, or key, or inter-locking feature, or indexing feature, that mates with the receiving member. It happens that an L-shaped angle iron may be a convenient form having these properties.

In the embodiment shown in FIG. 1*a*, inasmuch as each leg 84, 86 may pass through the wall insulation panels 56, each leg may also have an array of apertures as at 124, such as may reduce the section for heat transfer in the y-direction. In some embodiments apertures 124 may be non-circular, and may have an oval, oblong, or elliptical form. The form of aperture may have a long axis and a short axis. The long axis may be inclined at an angle to the perpendicular. In one embodiment the angle of inclination may be about 45 degrees. The interstitial strips 126 between adjacent apertures may tend to be correspondingly inclined on a generally diagonal angle. On the diagonal angle, the diagonal may be oriented from outwardly and downwardly to upwardly and inwardly, i.e., the mean slope dz/dy in FIG. 1*b* is negative. As such, a vertical load imposed at interface 96 may tend to place members 126 in tension, or to impose a tensile load component in them.

In the alternate embodiment of FIGS. 5*a* and 5*b* there is a first member of a support assembly, identified as bracket 128. Bracket 128 has a back 130, and first and second legs 131, 132, the legs and the back being joined together to for a U-shaped channel as indicated. In this instance the seat for the shelf angle may be defined by a slot 134 and the uppermost end 135 of an upwardly extending finger 136. In this example, the shelf angle (not shown, but understood to be the same as, or similar to, shelf angle 162, below) may seat in an inverted orientation, with the back web extending downward into the slot, and the root of the horizontal flange being supported on ends 135 of fingers 136. The ends of fingers 136 are vertically shy of the upper edge 133 of the proximal portion of legs 131, 132 such that, on installation, the upwardly facing surface of the horizontal flange of the inverted shelf angle may lie flush with edges 133. Ends 135 may define the shear load receiving interface. Given the downward vertical loading orientation of the accommodations defined by slots 134, slots 134 may be straight-sided, since they do not have to allow for angular rotation upon entry. Slots 134 may nonetheless define a moment-couple reaction interface such as may tend to react the eccentric moment due to loading on horizontal flange. Bracket 128 may have an array of reliefs or apertures, as indicated at 138. Apertures 138 may be non-circular, and may have a major axis and a minor axis, as do the elliptical apertures shown in FIGS. 5*a* and 5*b*. As before, the major axis of the ellipse may be angled upwardly and inwardly toward back 130. Apertures 138 may correspond in number, size, spacing, angle, and arrangement to apertures 124 in FIGS. 1*b* and 2*b*. Back 130 may have a mounting fitting, such as slot 129, which may be taken as being the same as slot 92 noted above. As above, bracket 128 has a general squareness when taking the ratio of z-direction height to y-direction depth, falling in the same range as member 50 discussed above. Likewise, the seat defined by slot 134 has the same y-direction relationship of projection relative to slot 129, the slot being opposed or generally in line with the mounting fitting. Whether upright, as in FIGS. 1*a* and 1*b*, or inverted, as in the embodiment of FIGS. 5a and 5b, the shelf angle and bracket assembly may employ apertures to reduce thermal conductivity through the bracket in the y-direction.

Support assemblies 26 need not be located only at the lowermost course of facing elements. As seen in FIGS. 6a, 6b, 6c, and 6d, such assemblies may be located at intermediate height locations, where there are bricks both above and below the support bench defined by the horizontal leg of the shelf angle. Such intermediate height locations may occur at horizontal control joints, which may typically be employed in non-residential structures having wall heights in excess of 30 ft. A shelf angle may then be used for each successive storey. Whatever the case may be, the height of the structure to which the support assembly may be mounted may not necessarily be the height of the structure at which the shelf angle is to be located. As suggested by the illustrations in FIGS. 6a-6d, there may be circumstances when the shelf angle is to be located some distance below the level of the securement to load-bearing structure.

Figure 6A:
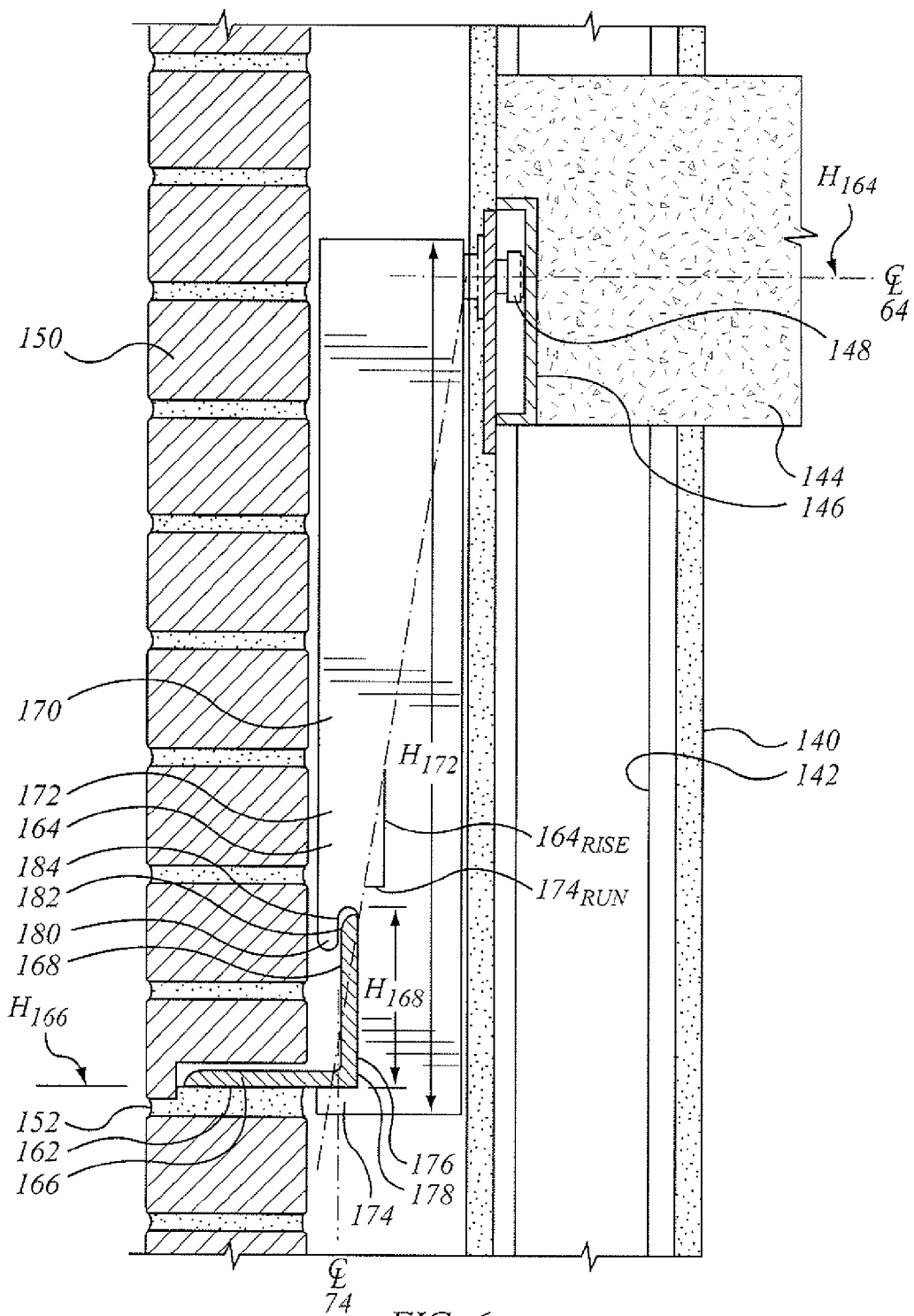

Considering FIG. 6a, structural load-bearing wall assembly 140 may have steel framing 142 and a floor slab 144. A hard-point, or rail, 146 is located at the end of floor slab 144. A mounting fitting 148 is secured to rail 146. An external facing veneer assembly is identified as 150. Veneer assembly 150 has a horizontal expansion joint 152. Veneer assembly 150 is connected to wall assembly 140 by a vertical load transfer assembly 160 that, as before, includes a first member 162 and a second member 164. First member 162 may be the received member, and may be a shelf angle. The shelf angle may have a first portion identified as horizontal leg 166 and a second portion identified as upright leg 168. The shelf angle, and in particular horizontal leg 166, may be located at the position of horizontal expansion joint 152, such that it bears the vertical load of that portion of wall assembly 150 extending upwardly thereof.

Second member 164 may be the receiving member with which it co-operates, and may be a channel-shaped bracket 170. As before, the receiving member 164 is rigidly secured to the load bearing wall structure, namely wall assembly 150. On installation, the back of bracket 170 lies in facing abutment against the load bearing wall structure in the same manner, or substantially the same manner, as member 50 described above, and where the wall is vertical, bracket 170 is correspondingly vertical. The load output interface of vertical load transfer assembly 160, namely the connection to the load bearing wall, is located at a first height, identified as $H_{164}$. The load input interface of assembly 160, at which the vertical load of the external veneer or cladding is received at leg 166, is identified as a second height, $H_{166}$. The first height is substantially higher than the second height. That is, $H_{162}$ lies at a level that is below the height of the bottom margin of the floor slab, and at a height that is more than two brick courses (i.e., more than 6") below $H_{164}$. Side web or leg 172 of channel or bracket 170 is much deeper in the z-direction (see $H_{172}$) than is the depth of the accommodation for the shelf angle, i.e., first member 162, identified as $H_{168}$.

In the embodiment of FIG. 6a, second member 164 may have substantially the same mounting arrangement and adjustability as back 82 of bracket 46. The receiving seat or accommodation may differ, though. That is, there may be a vertical load reaction member, in the nature of a protruding toe 174 having an upper shoulder or side, or face, upon which shelf angle 162 rests. A relief or slot, or rebate, or accommodation 176 may extend upwardly therefrom, the slot being bounded by a first wall or vertex, or abutment 178 that defines the first moment couple reaction interface. At the upwardly distant end of accommodation 176 there is an overhanging, downwardly extending finger 180, the overhang being spaced away forwardly by a gap defining a slot 182 sized to fit the upper margin of the angle iron leg. The inner face or side of finger 180 defines the second moment couple resisting interface 184.

Figure 6B:
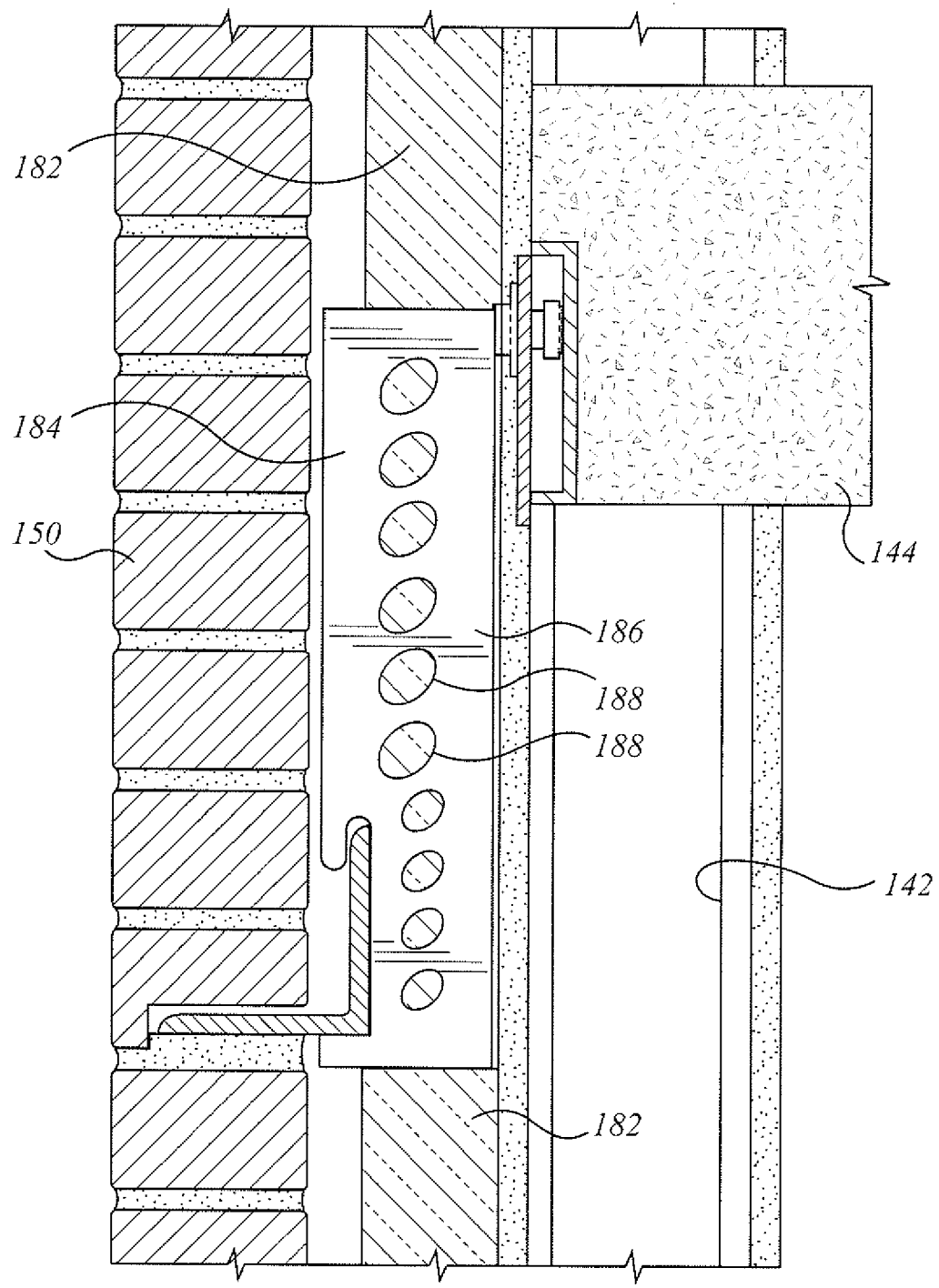

In the embodiment of FIG. 6b, insulation 182 is located in the space between load-bearing wall assembly 140 and veneer assembly 150. Bracket 184 is may be understood to be the same as bracket 164, except insofar as, in the manner of the embodiment of FIG. 1a, web 186 of bracket 184 is perforated as at 188 to reduce the conduction heat transfer path width across the bracket.

Figure 6C:
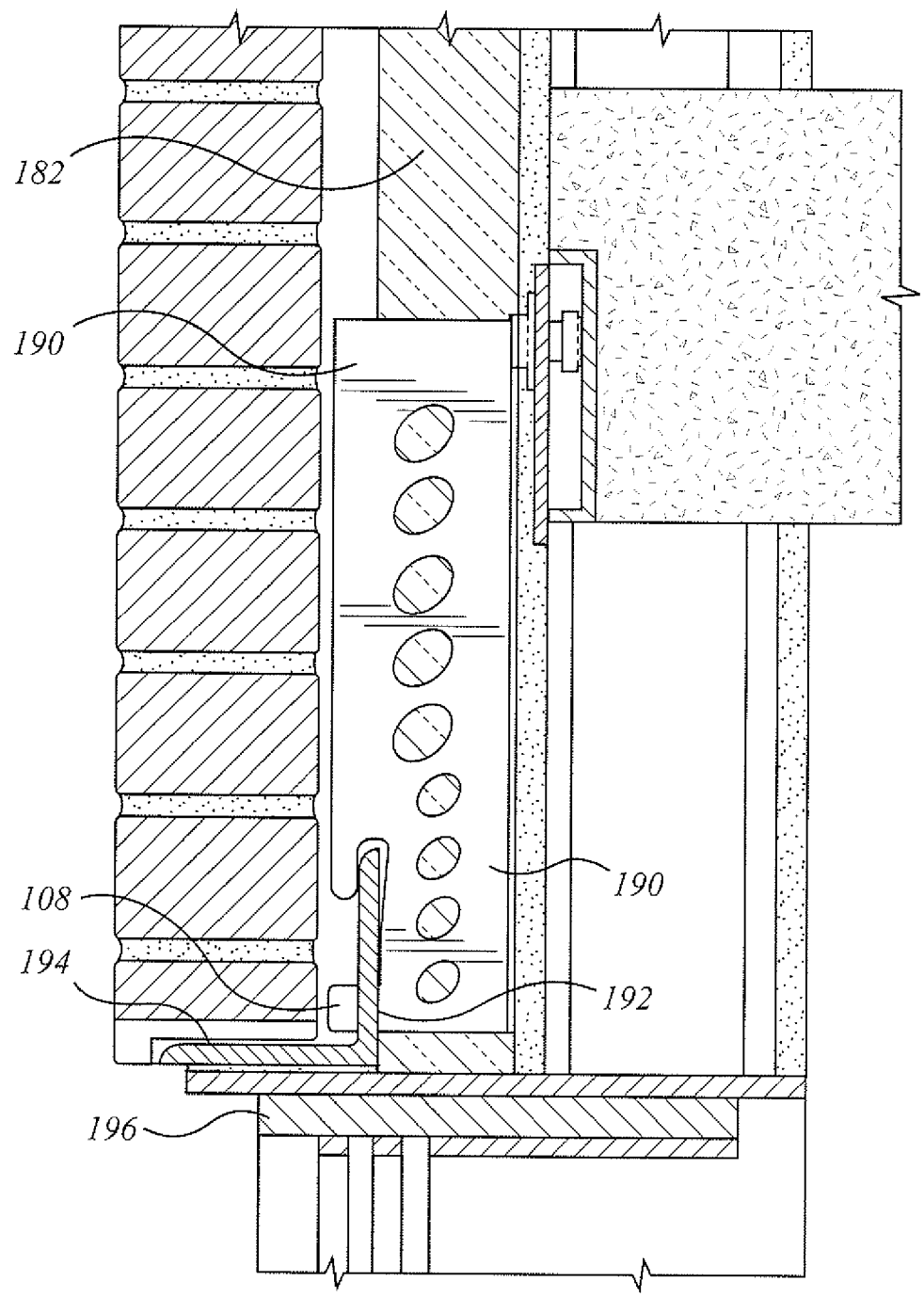

In the embodiment of FIG. 6c, bracket 190 is substantially the same as bracket 46, except of greater vertical extent in the manner of bracket 164; or, equivalently, bracket 190 is substantially the same as bracket 184 except in respect of having a receiving seat 192 that corresponds to the receiving seat of bracket 46. In this embodiment, first member 194 may be taken as being the same as first member 44 in having apertures or reliefs 120, 122 in the upstanding leg that engage with the protruding toes 108 of the various spaced bracket. It may be that such an embodiment may be desirable where the shelf angle forms a header or sill over a window or door opening or window or door installation, as at 196.

Figure 6D:
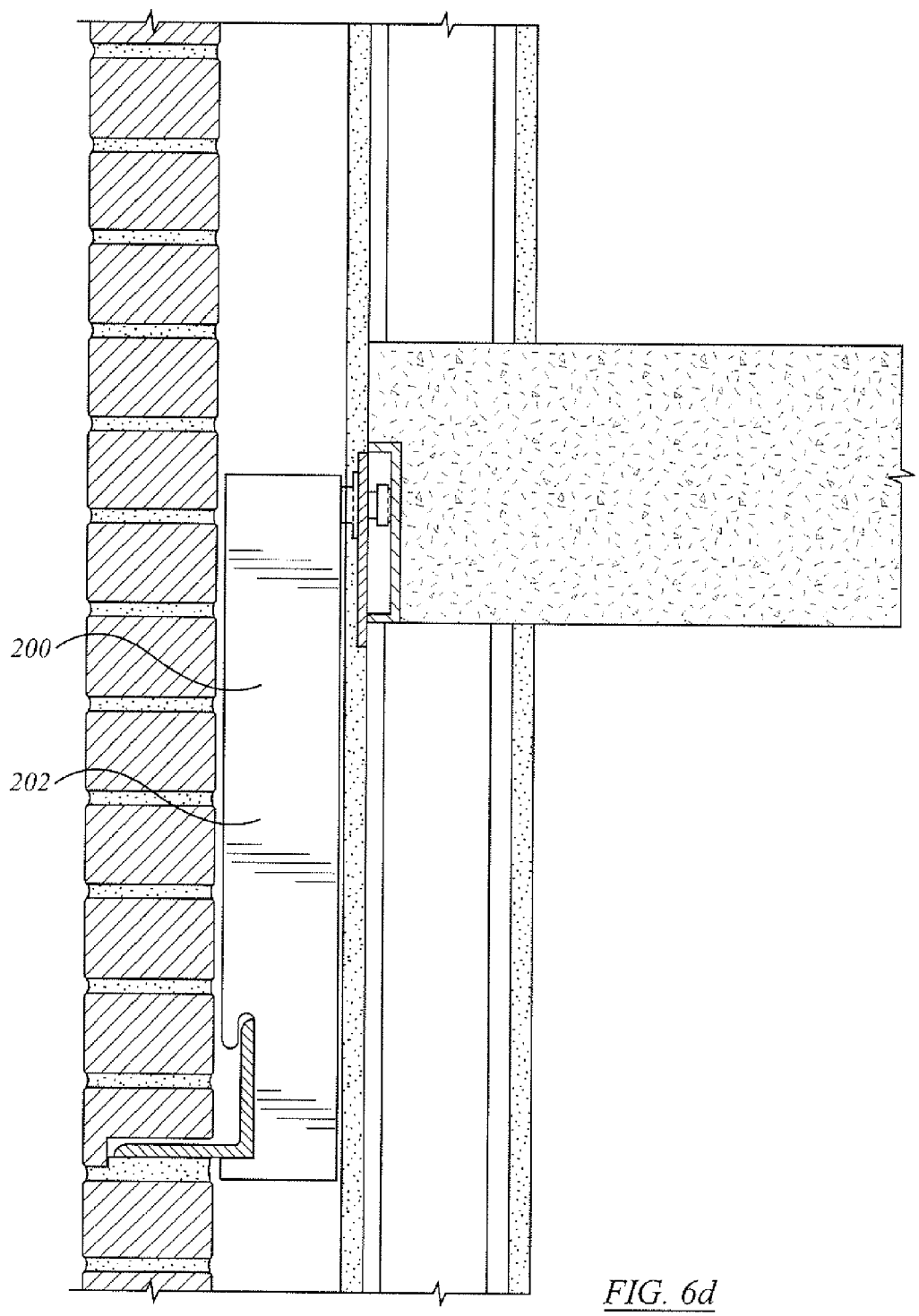

The embodiment of FIG. 6d is substantially the same as the embodiment of FIG. 5a, except insofar as it shows a vertical load transfer assembly 200 in which the receiving load transfer member, or bracket, 202 is of greater length than in FIG. 5a, such as may be suitable where the expansion joint (or window header or door header) is more distant from the floor plate to which the assembly is anchored. The embodiment of FIG. 5d may also be modified to correspond to the embodiments of FIGS. 5b and 5c, as may be.

In each of FIGS. 6a-6d, if one defines a load center at the vertical load input interface of the seat, notionally $C_{174}$ and another load center at the connection point, or centroid, of the fastening connection or connections to the load-bearing wall structure, notionally $C_{164}$, the line of action constructed between those centers extends upwardly and toward the load-bearing structure. That line of action is predominantly upwardly oriented, i.e., the rise is greater than the run, as suggested by the ratio of $164_{Rise}/174_{Run}$. This may also be expressed in terms of the hanging, non-square nature of the mounting brackets of FIGS. 6a-6d. In these embodiments the y-direction projection of the seat does not fall on the footprint of the mounting fitting, but rather falls well below it. The seat is not in line with the mounting fitting. On the contrary, the seat is downwardly displaced from the centerline of the mounting fitting at $C_{164}$ by several pitches of the magnitude of the seat height, $H_{168}$. This downward offset of seat 168 (or, from the other perspective, upward offset of fitting 148) is more than one pitch of the seat height, and may be up to 6 or 8 pitches, or may lie in the range of 2 to 8 pitches of the seat height.

In each of the embodiments of FIGS. 6a-6d it may be that the receiving member, such as 170, may be a bracket having a channel-shaped cross-section when viewed from above, that cross section being substantially similar to, or the same as, that of member 50 such as illustrated in FIG. 1e or 2a. However, in an alternate embodiment, the receiving member, corresponding to item 170, may have a single web standing outwardly away from the supporting load-bearing wall structure. The web may be aligned on the center-line of the fastening mount at item 148. In some embodiments the receiving member may be an angle bracket having a flange that locates in facing abutment against the wall structure, and a web that stands perpendicular to the wall structure.

In each case the general description of installation and use is substantially the same. That is, a brick support in the form of a standard size shelf angle is mounted across the wall on the anchoring brackets. The anchoring brackets are first bolted to the wall by securing the bolts loosely by hand. The brick support is then mounted on the anchoring brackets by inserting a edge portion of the mounting flange 118 upward into the receiving slot 92 of each anchoring bracket 52 (or as may be) at an incline and then by pivoting the supporting flange inward until the mounting flange engages the rearward edge of seat 94. The rearward edge at 102 prevents the brick support from being further pivoted within the recessed channel under the increasing moment couple as the weight of the bricks is applied to the brick support. The bolts are then tightened snugly and the wedge shaped shims may be inserted to suit.

Until the nuts on the respective bolts are tightened, the relative height of each anchoring bracket is adjustable by sliding the anchoring bracket laterally along the brick support as the anchoring bracket is moved upward or downward relative to the bolt extending from the wall. This lateral movement of the anchoring bracket relative to the brick support with the adjustment in height is due to the inclination of the fastener slot from the vertical.

Once the nuts are tightened on the bolts the brick support is secured to the load-bearing wall structure, and bricks may be supported thereon. The inclination of the fastener slot from the vertical acts to inhibit vertical displacement of the anchoring bracket along the mounting bolt through the resistance of the lateral movement of the anchoring bracket along the brick support. Having anchoring brackets of opposing orientation mounted adjacent to each other further restricts the entire brick anchor system from shifting positions relative to the wall once the bolts are tightened.

The relative location of the anchoring brackets remains adjustable as the brick support is mounted thereon for accommodating irregularities in the wall or misalignment between adjacent anchoring brackets. Once the brick support is securely fastened to the wall further vertical displacement of the anchoring brackets is inhibited by the resistance of lateral movement of the anchoring brackets relative to the brick support due to the arrangement of the fastener slot.

A shim plate which is substantially similar in size to the anchoring bracket, mounts between each anchoring bracket and the outer face of the wall for evenly engaging the concrete surface and for spacing each anchoring bracket from the wall as desired to accommodate for irregularities in the outer face of the wall.

Various embodiments of the invention have been described in detail. Since changes in and or additions to the above-described best mode may be made without departing from the nature, spirit or scope of the invention, the invention is not to be limited to those details but only by the appended claims.

I claim:

1. An external facing support assembly, said assembly comprising:
    a first member and a second member, said second member being engageable with said first member for support thereby;
    said first member being a U-shaped bracket having a back and first and second legs extending from said back;
    said back having a mounting fitting by which to secure said back to a load bearing wall structure;
    said first member having a seat located distant from said mounting fitting, as installed said seat being spaced away from the load bearing wall structure;
    said seat having a protrusion, a shear load receiving interface, and a moment couple reaction interface;
    said second member being a shelf angle;
    said shelf angle having an horizontally extending flange, said horizontally extending flange defining an external facing carrier, and said shelf angle having a web running along said flange, said web having a seat engagement, said flange being connected to said web;
    said seat engagement of said web of said shelf angle having an accommodation defining a lodgement into which to admit said protrusion on installation; a shear load transmission interface that, in use, engages said shear load receiving interface; and a moment couple transmission interface that, in use, engages said moment couple reaction interface;
    said first and second legs of said bracket each having a seat into which to introduce at least a first portion of said web;
    said first and second legs of said bracket each having a protruding toe adjacent to its respective seat; and
    said web of said shelf angle having at least one lodgement into which to engage said respective protruding toes when said first portion of said web is located in each said seat.

2. The external facing support assembly of claim 1, wherein said protrusion has an upwardly facing shoulder, and said upwardly facing shoulder defines said shear load receiving interface.

3. The external facing support assembly of claim 1 wherein said carrier has an upwardly facing interface above which to locate the external facing, and, as installed in use, said shear load receiving interface is located higher than said upwardly facing interface of said carrier.

4. The external facing support assembly of claim 1 wherein said seat engagement extends rearwardly and upwardly of said carrier.

5. The external facing support assembly of claim 1 wherein said assembly includes a plurality of said first members, and said second member has a plurality of said accommodations corresponding to said plurality of said first members.

6. The external facing support assembly of claim 1, wherein:
    said protrusion has an upwardly facing shoulder defining said shear load transmission interface;
    said seat includes an upwardly extending slot and an overhanging finger;
    said second member seat engagement includes a web having an upwardly extending extremity that, on assembly, seats in said slot;
    said over-hanging finger defines one portion of said moment-couple reaction interface.

7. The external facing support assembly of claim 6, wherein
    said slot is oversized to admit at least partial angular rotation of said web of said second member on installation;
    said slot has a relieved first wall portion angled on a first angle relative to vertical;
    said overhanging finger has a downwardly distal tip, said downwardly distal tip being relieved to accommodate insertion of said web on assembly; said downwardly distal tip having a chamfer on a second angle relative to vertical; and
    said second angle being greater than said first angle.

8. An external facing support assembly, said assembly comprising:

a first member and a second member, said second member being engageable with said first member for support thereby;

said first member having a mounting fitting by which to secure said assembly to a load-bearing wall structure;

said first member having a seat located distant from said mounting fitting, as installed said seat being spaced away from the load bearing wall structure;

said seat having a protrusion, a shear load receiving interface, and a moment couple reaction interface;

said second member having an external facing carrier and a seat engagement, said carrier being connected to said seat engagement;

said seat engagement having an accommodation defining a lodgement into which to admit said protrusion on installation;

a shear load transmission interface that, in use, engages said shear load receiving interface; and a moment couple transmission interface that, in use, engages said moment couple reaction interface; and said carrier of said second member is located lower than said protrusion of said first member; and on assembly, said external facing carrier is located one of:
 (a) flush with a lowermost part of said first member; and
 (b) downwardly proud of said lowermost part of said first member.

9. The external facing support assembly of claim 8 wherein said assembly includes a plurality of said first members, and said second member has a plurality of said accommodations corresponding to said plurality of said first members.

10. The external facing support assembly of claim 8, wherein:
 said first member is a channel member having a back and a pair of first and second legs extending away from said back;
 said first member includes said back of said channel member;
 said first leg of said channel member defines one said second portion of said first member;
 said second leg of said channel defines another said second portion of said first member;
 each of said first and second legs has one said protruding toe; and
 said back of said second member has said first accommodation and a second accommodation, said first and second accommodations being spaced apart to receive the respective protruding toes of said first and second legs of said channel member.

11. The support assembly of claim 10 wherein said second member is a shelf angle, said shelf angle having an horizontal leg and an upstanding back, said external facing carrier of said second member is said horizontal leg of said shelf angle, and said seat engagement includes an aperture defined in said back of said shelf angle.

12. The external facing support assembly of claim 8, wherein said protrusion has an upwardly facing shoulder, and said upwardly facing shoulder defines said shear load receiving interface.

13. The external facing support assembly of claim 8 wherein said carrier has an upwardly facing interface above which to locate the external facing, and, as installed in use, said shear load receiving interface is located higher than said upwardly facing interface of said carrier.

14. An external facing support assembly, said assembly comprising:
 a first member and a second member, said second member being engageable with said first member for support thereby;
 said first member having a mounting fitting by which to secure said assembly to a load-bearing wall structure;
 said first member having a seat located distant from said mounting fitting, as installed said seat being spaced away from the load bearing wall structure;
 said seat having a protrusion, a shear load receiving interface, and a moment couple reaction interface;
 said second member having an external facing carrier and a seat engagement, said carrier being connected to said seat engagement;
 said seat engagement having an accommodation defining a lodgement into which to admit said protrusion on installation; a shear load transmission interface that, in use, engages said shear load receiving interface; and a moment couple transmission interface that, in use, engages said moment couple reaction interface; and
 said second member is a shelf angle having a flange and a web, said flange defining an upwardly facing external veneer load receiving interface; said web having said accommodation for said protrusion formed therein.

15. The external facing support assembly of claim 14 wherein said web is an upstanding web; and said upstanding web has a greater vertical extent than said seat.

16. The external facing support assembly of claim 15 wherein said web includes an aperture formed therein at a medial height location thereof, said protrusion is a protruding toe, and said aperture permitting introduction of said protruding toe therethrough, and said aperture defining said accommodation.

17. The external facing support assembly of claim 14 wherein, said protrusion is a protruding toe, and, on assembly, said flange is located one of:
 (a) flush with a lowermost portion of said protruding toe; and
 (b) downwardly proud of said protruding toe.

18. The external facing support assembly of claim 14 wherein said flange and said web meet at a vertex, said vertex having an internal radius, and said accommodation is formed as an aperture in said web upwardly clear of said radius.

19. The external facing support assembly of claim 14 wherein said first member is a channel member, having a back and two spaced apart legs extending away from said back to form a channel, said back of said channel having said mounting fitting, and each of said legs of said channel having one of said seats.

20. The external facing support assembly of claim 14 wherein said assembly includes a plurality of said first members, and said second member has a plurality of said accommodations corresponding to said plurality of said first members.

* * * * *